United States Patent
Kettner et al.

Patent Number: 5,971,287
Date of Patent: Oct. 26, 1999

[54] METHOD AND SYSTEM FOR REGULATING THE MIXED-AIR OF A HEATING/AIR-CONDITIONING SYSTEM OF A MOTOR VEHICLE

[75] Inventors: Detlef Kettner, Brühl; Gregor Gattnar, Neu Anspach, both of Germany

[73] Assignee: Max Kammerer GmbH, Oberursel, Germany

[21] Appl. No.: 08/907,567

[22] Filed: Aug. 8, 1997

[30] Foreign Application Priority Data

Aug. 9, 1996 [DE] Germany ............... 196 32 059

[51] Int. Cl.$^6$ ............... F24F 3/14; B01F 3/02
[52] U.S. Cl. ............... 236/44 A; 165/230; 454/75; 454/121
[58] Field of Search ............... 454/75, 14, 99; 165/230; 236/44 A, 91 C

[56] References Cited

U.S. PATENT DOCUMENTS

| | | | |
|---|---|---|---|
| 4,932,588 | 6/1990 | Fedter et al. | 165/230 X |
| 5,516,041 | 5/1996 | Davis, Jr. et al. | 454/75 X |
| 5,651,498 | 7/1997 | Meyer et al. | 236/91 C |

FOREIGN PATENT DOCUMENTS

| | | |
|---|---|---|
| 3624170 | 1/1988 | Germany . |
| 4031050 | 4/1991 | Germany . |
| 4316557 | 11/1994 | Germany . |

OTHER PUBLICATIONS

Die Mischluftregelung in Lüftungs–und Teilklimaanlagen of Eng. Gerhard Pippig, Freiburg/Brg. 1965 –Sanitar und Heizungstechnik, No. 2, pp. 57–63.

*Primary Examiner*—William Wayner
*Attorney, Agent, or Firm*—Martin A. Farber

[57] ABSTRACT

A method and a system for regulating the mixed air in a heating/air-conditioning unit (1) of a motor vehicle in which fresh air and/or recirculated air are fed to a heating/air-conditioning unit (1) which controls the feeding of fresh air and/or recirculated air in the passenger compartment of the vehicle. In a method for optimizing the consumption of energy for such heating/air-conditioning systems, the feed of fresh air and/or recirculated air is so adjusted that the temperature of the dew point of the air within the vehicle is less than the temperature on the inside of a window of the vehicle.

14 Claims, 4 Drawing Sheets

METHOD AND SYSTEM FOR REGULATING THE MIXED-AIR OF A HEATING/AIR-CONDITIONING SYSTEM OF A MOTOR VEHICLE

FIELD AND BACKGROUND OF THE INVENTION

The present invention relates to a method and system for regulating the mixed air of a heating/air-conditioning unit of a motor vehicle, wherein fresh air and/or recirculated air is fed to a heating/air-conditioning unit which controls the feeding of fresh air and/or recirculated air into the inside of the vehicle.

In the motor-vehicle heating/air-conditioning systems which are customary today, fresh air or recirculated air, or else a mixture of recirculated air and fresh air in a constant mixture is conducted by a fan through the air conditioning system for a conditioning of the air.

With increasing demands as to comfort, the desire has arisen in the case of motor-vehicle heating and air-conditioning systems for automatic control of the temperature within the car in such a manner that the passengers feel as comfortable as possible withing the car. Ordinarily, for this, the temperature within the car is measured by means of a temperature sensor, and the desired temperature is set by means of a regulating unit.

From German patent document DE 36 24 1700 A1 a method of operating a heating/air-conditioning system for motor vehicles is known in which the climate in the vicinity of the windshield is so controlled as a function of signals of a first temperature sensor and a first humidity sensor as well as at least one further temperature sensor arranged outside the motor vehicle, providing that the temperature on the inside of the windshield is prevented from dropping below the dew point.

In particular, when heating, modern internal combustion engines do not always make sufficient exhaust heat available for heating the interior of the vehicle. In order to compensate for this insufficient heating, electrical or fuel-operated additional heaters are introduced into the heating system. In this connection, generally low-energy outside air is brought to a desired temperature level, which results in an additional consumption of energy. In electrical vehicles, the high energy consumption of a heating system has a negative influence on the driving performance and range of the vehicle.

SUMMARY OF THE INVENTION

It is an object of the invention to provide a method for optimizing the energy consumption of heating/air-conditioning systems of a motor vehicle.

According to the invention, the feeding of fresh air and/or recirculated air is so adjusted that the temperature of the dew point of the air within the vehicle is lower than the temperature on the inside of the windshield of the vehicle.

The advantage of the invention is that an automatically regulated air mixture is fed to the heat exchanger of the heating/air-conditioning unit, said mixture having the state of energy which is most favorable. A fogging of the windshield of the vehicle on the inside of the vehicle is thus effectively prevented without diverting the attention of the driver from the traffic. The required heating power can be substantially reduced thereby. Generally, it is possible to dispense with expensive additional heating means.

According to the invention, a minimum amount of fresh air is adjusted as a function of the moisture which is to be removed from the inside of the window of the vehicle.

In a further development, the relative humidity of the air and the temperature of the air within the vehicle are measured in order to determine the dew point of the air within the vehicle.

The determination of the temperature of the windshield is effected by direct measurement of the temperature on the inside of the windshield of the vehicle.

As an alternative to this, the windshield temperature is derived from the temperature of the fresh air and calculated from corresponding correction values.

The temperature of the dew point of the inside air is advantageously so adjusted by the ratio of fresh air to recirculated air by the feeding of fresh air that the dew point temperature is less than the temperature on the inside of the windshield of the vehicle.

A sufficient stream of fresh air absorbs moisture which has condensed within the vehicle.

In a further development, a moisture-based minimum proportion of fresh air is adjusted as a function of the moisture to be removed from within the vehicle. In one embodiment, this is effected as a function of the number of persons present in the vehicle. However, it can also be effected by a comparison of the dew point of the air within the vehicle and the temperature on the inside of the windshield.

In order to assure a dependable supply of oxygen for the passengers, a minimum stream of fresh air is continuously introduced into the inside of the windshield.

In order to make certain that all the persons present in the vehicle receive sufficient fresh air, the minimum stream of fresh air based on the need for oxygen is selected as a function of the number of persons present in the vehicle or presumed or calculated as a function of signals supplied by a pollutant sensor.

For a limited period of time, 100% recirculated air is also possible.

The minimum proportion of fresh air based on the moisture is compared with the minimum stream of fresh air based on the oxygen requirement, and a larger stream of fresh air in each case is set by means of an air-vent system as the desired stream of fresh air.

In a further development of the invention, the specific enthalpy of the fresh air and that of the recirculated air and/or a mixed air is determined and, after a comparison of the specific enthalpies thus determined, the feed of fresh air and/or recirculated air is so adjusted that the mixed air has the specific enthalpy which is most favorable from an energy standpoint in each case.

Based on a minimum amount of fresh air which is necessary in order to take up the moisture to be conducted out of the inside of the car and to assure the necessary supply of oxygen to those within the car, the system of vents is so adjusted that, after the comparison of the specific enthalpies, the feeding of fresh air and recirculated air is adjusted in such a manner that the smallest difference in specific enthalpy is set on a heat exchanger.

The determination of the specific enthalpy is effected by measuring the temperature and the relative humidity of the corresponding stream of air. As an alternative, the specific enthalpy is determined by means of the wet bulb temperature.

The method of the invention is preferably carried out by an arrangement which has a fresh-air vent (2) and a recirculated-air vent (3) in a heating and air-conditioning unit of a motor vehicle, which vents can be controlled by at least one adjusting element (2c, 3c) of a heating and air-conditioning control unit (7). Also, the heater and air-conditioner control unit are connected with an inside-temperature sensor (3a) and an air-moisture sensor (3b) which are arranged in the passenger compartment and supply the corresponding signals for determining the temperature of the dew point of the air within the vehicle. Furthermore, the heating and air-conditioning control unit (7) opens and closes the fresh-air vent (2) and the recirculated-air vent (3) as a function of these signals.

According to a feature of the invention, a temperature sensor (8) for determining the windshield temperature is arranged on the inside of a vehicle windshield (9).

In the fresh air and/or the recirculated air or mixed air there are advantageously arranged a further temperature sensor (2a, 5a) and a air-moisture sensor (2b, 5b) which are connected to the heating and air-conditioning control unit (7). The heating and air-conditioning control unit (7) determines from these signals and from the signals of the sensors (3a, 3b) for the temperature and the relative air humidity, the later being located for sensing air within the vehicle, the specific enthalpies of the stream of fresh air, recirculated air and/or mixed air, and adjusts the fresh-air vent (2) and the recirculated-air vent (3) as a function of the specific enthalpies.

The inside temperature sensor (3a) and the humidity sensor (3b) are arranged in a path of the recirculated air in the passenger compartment.

As a further development, the temperature sensor (5a) and the humidity sensor (5b) of the stream of mixed air or the mixed air (5) are arranged behind a fan (4).

The heating and air-conditioning control unit (4) is connected to sensors for the detection of passengers in the vehicle.

With known means present in every heating/air conditioning unit, it is thus possible to carry out the method of the invention in simple fashion.

In particular, the use of a microcomputer as regulating means permits a simple determination of the dew point temperature of the air within the car as well as of the specific enthalpy of fresh air, recirculated air, and mixed air by means of suitable software.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
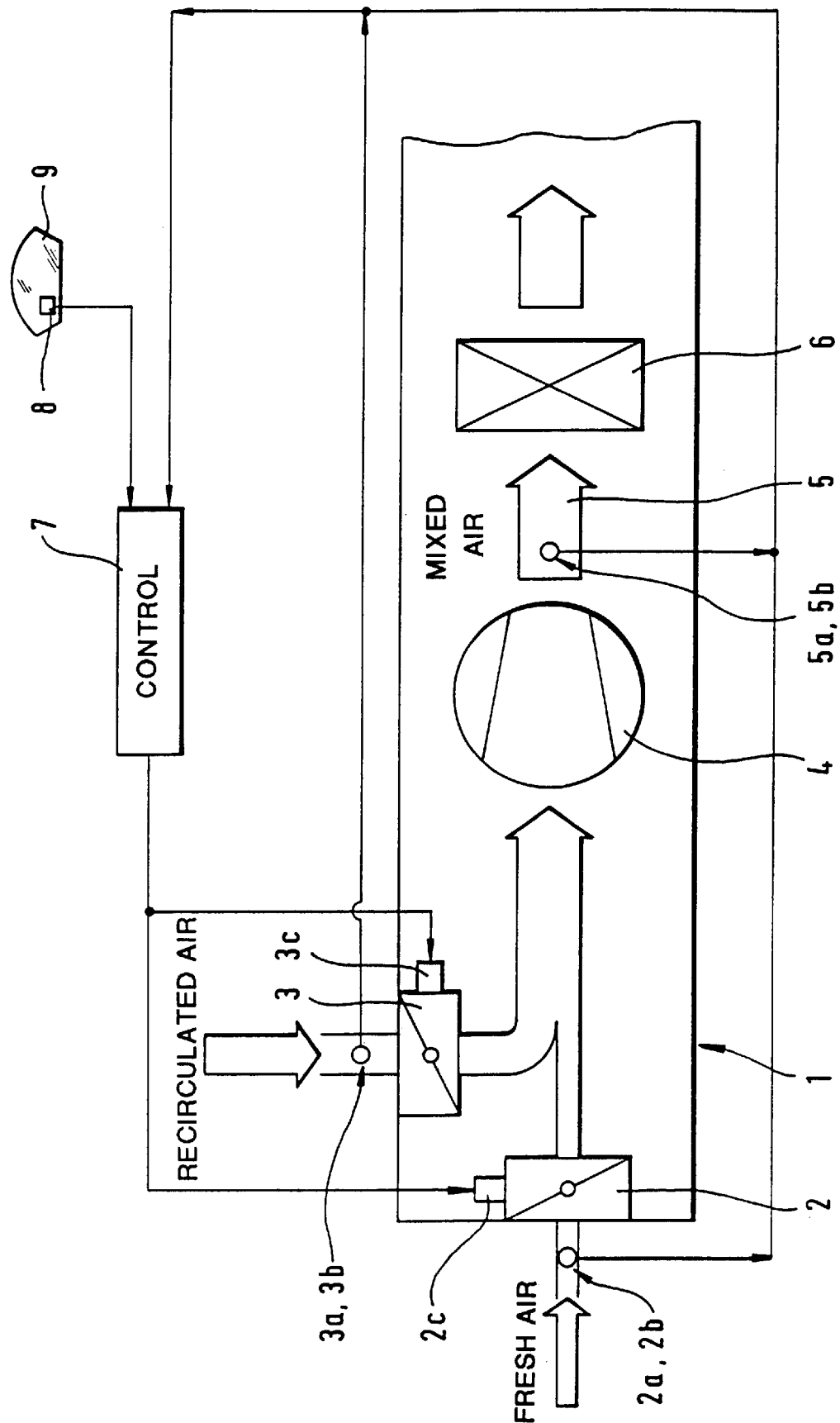
FIG. 1 shows apparatus of a heating and air-conditioning system of a motor vehicle necessary for practicing the invention.

In principle, air is fed from the outside to a passenger compartment in which the interior air is contained. This feed air is formed of fresh air and recirculated air together, but it may also consist of 100% fresh air or 100% recirculated air.

The exhaust air removed from the passenger compartment is given off proportionally as discharge air to the atmosphere or fed again as recirculated air to the passenger compartment. In this case also, the proportions are variable and vary between 0 and 100%. In order to adjust this air cycle, both a fresh-air vent 2 for the feeding of fresh air and a recirculated air vent 3 for adjusting the feed of recirculated air out of the vehicle are arranged in a heating and air-conditioning unit 1. This system of vents makes it possible to establish a specific ratio of fresh air to recirculated air.

The system of vents can consist of a fresh-air/recirculated-air vent as well as of several vents, independent from or dependent on each other, for the fresh air and recirculated air. In order to explain the invention, one fresh-air vent 2 and one recirculated-air vent 3 are sufficient, each being controlled by a separate servomotor 2c. 3c.

The fresh air and recirculated air are conveyed by a fan 4 and at the same time eddied. Mixed air 5 is produced which is fed to the heat exchanger 6 and from the latter, upon a heating operation, given off to the interior of the vehicle as feed air.

The required heating output of the heat exchanger 6 of a heating/air-conditioning unit 1 is determined from the product of the specific enthalpy difference between entrance and exit of the air, to be heated via the heat exchanger, and of the mass flow of air through the heat exchanger.

In order to obtain a ratio of fresh air to recirculated air which is favorable from an energy standpoint, the specific enthalpy of both the fresh air and the recirculated air is determined.

As an alternative to this, the specific enthalpies of both the fresh air and of the mixed air 5 in front of the heat exchanger 6 can be compared.

For this purpose, a temperature sensor 2a is arranged in the fresh air in the vicinity of the fresh-air vent 2 of the passenger compartment and a sensor for the relative humidity 2b is arranged in the wall of the fresh-air duct.

A temperature sensor 3a and another sensor for the relative humidity 3b are also arranged in the vicinity of the recirculated-air vent 3 in the wall of the recirculated-air duct. In the same way as the sensors 2a, 2b in the fresh-air duct, and the sensors 3a, 3b in the recirculated-air duct can be injection molded, screwed or glued onto the wall. However, they can also be located in the compartment air or the removal air. The signals of the temperature sensors 2a, 3a of the humidity sensors 2b, 3b are fed to the heating and air-conditioning control unit 7 for the calculation of the specific enthalpies for the fresh air and the recirculated air. For the calculation of the temperature of the dew point of the recirculated air, the signals of the temperature sensor 3a and of the humidity sensor 3b are also used. For this purpose, it is, however, also conceivable to arrange on the inside of the rear windshield 9 of the vehicle a separate temperature sensor 8 which directly measures the temperature of the windshield and transmits it to the heating and air-conditioning control unit 7. This sensor 8 can advantageously be dispensed with if the temperature of the glass is determined from the temperature of the fresh air by means of correction values.

The specific enthalpies of the fresh air and the recirculated air determined in this way are compared with each other. Based on a minimum amount of fresh air which is necessary in order to take up the moisture to be removed from the passenger compartment, and to assure a supplying of the persons within the car with oxygen, the system of vents is so controlled that the smallest difference in enthalpy is present at the heat exchanger 6. The different states of openness of the individual vents can in this connection be fixed.

As already explained, a third temperature sensor 5a and a third humidity sensor 5b are arranged in the mixed air 5 on the wall of the mixed air duct behind the fan 4. The results of the measurements of these sensors are also fed to the heating and air-conditioning control unit 7 which calculates the specific enthalpy of the mixed air 5. Depending on the degree of precision of the adjustment, the settings of recirculated-air and fresh-air vents are determined as a function of the enthalpies of the fresh air and the recirculated air, or of the fresh air and the mixed air.

In order to effect a precise adjustment, it is also conceivable for the air conditioning control unit 7 to process the signals of the sensors in the recirculated air, fresh air and mixed air simultaneously.

Figure 2:
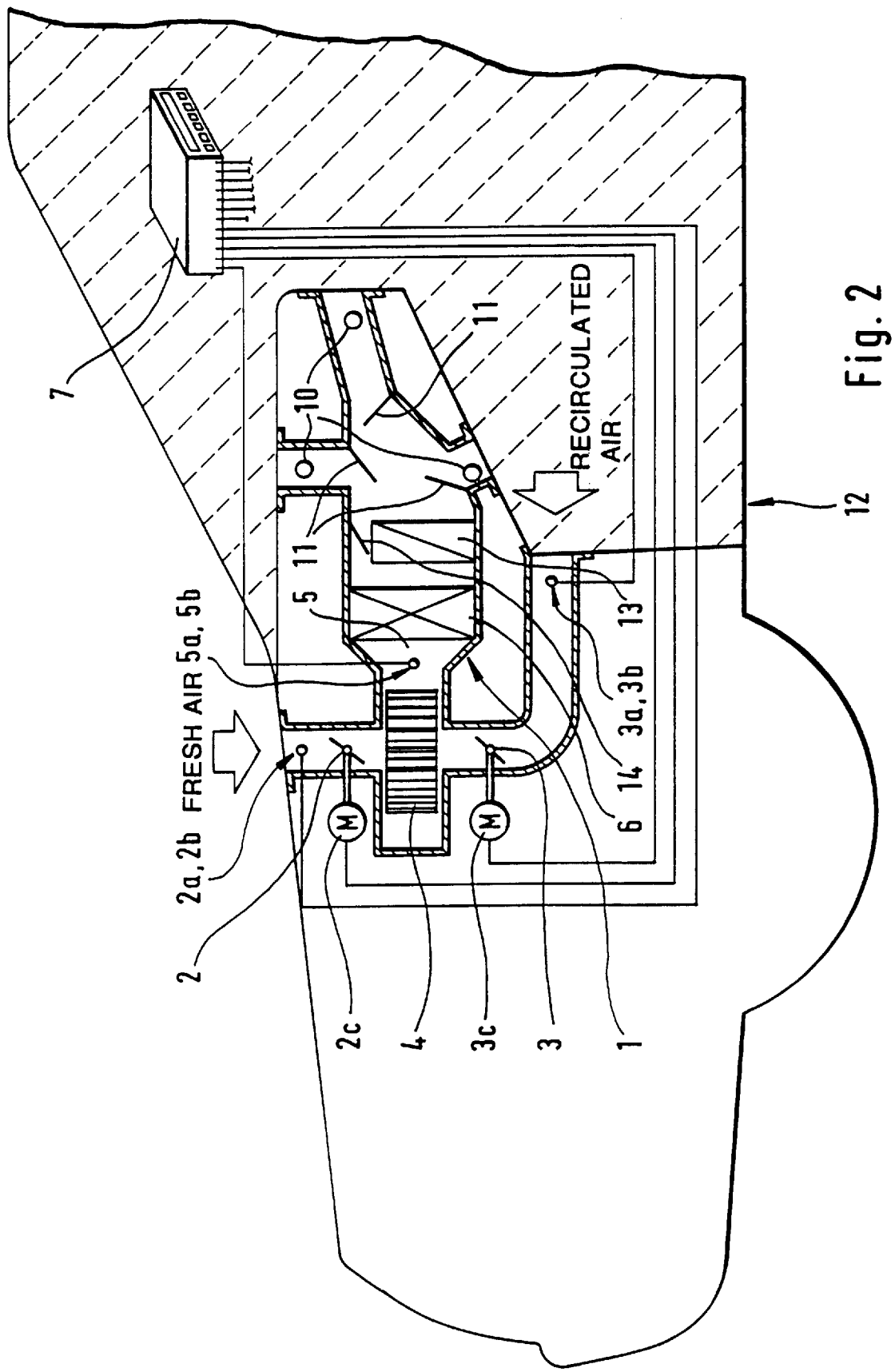
FIG. 2 shows an arrangement within the motor vehicle.

In accordance with FIG. 2, the air conditioning unit 1 is again shown in a concrete arrangement in the motor vehicle 12. The same features are designated in this connection by the same reference numerals.

Via the fresh-air vent 2, the position of which is adjusted by a servomotor 2c as a function of electric signals which are controlled by the air conditioning control unit 7 as a function of the method described, fresh air is drawn into the vehicle 12 from the outside thereof.

The recirculated air is drawn out of the passenger compartment of the vehicle via the recirculated-air vent of the air conditioning unit 1. The position of the recirculated-air vent 3 is also adjusted as a function of electric signals of the air conditioning unit 7 by a servomotor 3c. Via the fan 4, recirculated air and fresh air are introduced into the air conditioning unit, so that mixed air 5 is produced behind the fan 4 and fed to the cold heat exchanger 6.

In cooling operation, the mixed air 5 is fed via outside 10 into the passenger compartment. These outlets 10 are arranged in ducts which point in the direction of the windshield, in the direction of the driver or front-seat passenger, and in the direction of the feet of the driver or of the front-seat passenger. By means of the air distributing vents 11 arranged in the individual ducts, the entrance of air can be adjusted by the driver or the front-seat passenger.

Adjoining the cooling heat exchanger 6 there is a heating heat exchanger 13. The amount of air given off by the cooling heat exchanger 6 is conducted by means of a temperature vent 14 past the heating heat exchanger 8 and thereby heated. In heating operation, the mixed air which has been brought to the desired temperature then flows into the passenger compartment.

In order to assure a minimum amount of fresh air for the passengers, a minimum flow of fresh air based on the need for oxygen is adjusted stepwise, depending on the number of persons in the vehicle.

In order to determine how many persons are in the vehicle, electrical contacts, for instance capacitive sensors, in the passenger seats and/or the safety belt lock mechanisms are interrogated by the air conditioning control unit 7 and the corresponding minimum amount of fresh air based on the need for oxygen is set.

By means of the Mollier-h,x diagram for moist air shown in FIGS. 3 and 4 it will be explained how the inside air temperature in the passenger compartment is produced. In this diagram, the temperature T is plotted over the water content of the air (g/kg). As parameters there are shown the specific enthalpy in kJ/kg and the relative humidity of the air in per cent.

By the method known from the prior art (FIG. 3), fresh air AU is drawn in, it having a specific enthalpy $h_{AU}$ at a given temperature T. By means of the heating-engine waste heat and a possible additional heater, the fresh air AU is heated to a temperature of, for instance, 40° C. and conducted as feed air ZU with an enthalpy $h_{ZU}$ from the heating/air conditioning unit into the passenger compartment, the recirculated air RL produced in this way having a temperature of 22° C. With the feeding of 100% fresh air there is thus obtained an enthalpy difference in front of the heat exchanger of $\Delta h_1 = h_Z U - h_A U$.

Figure 3:
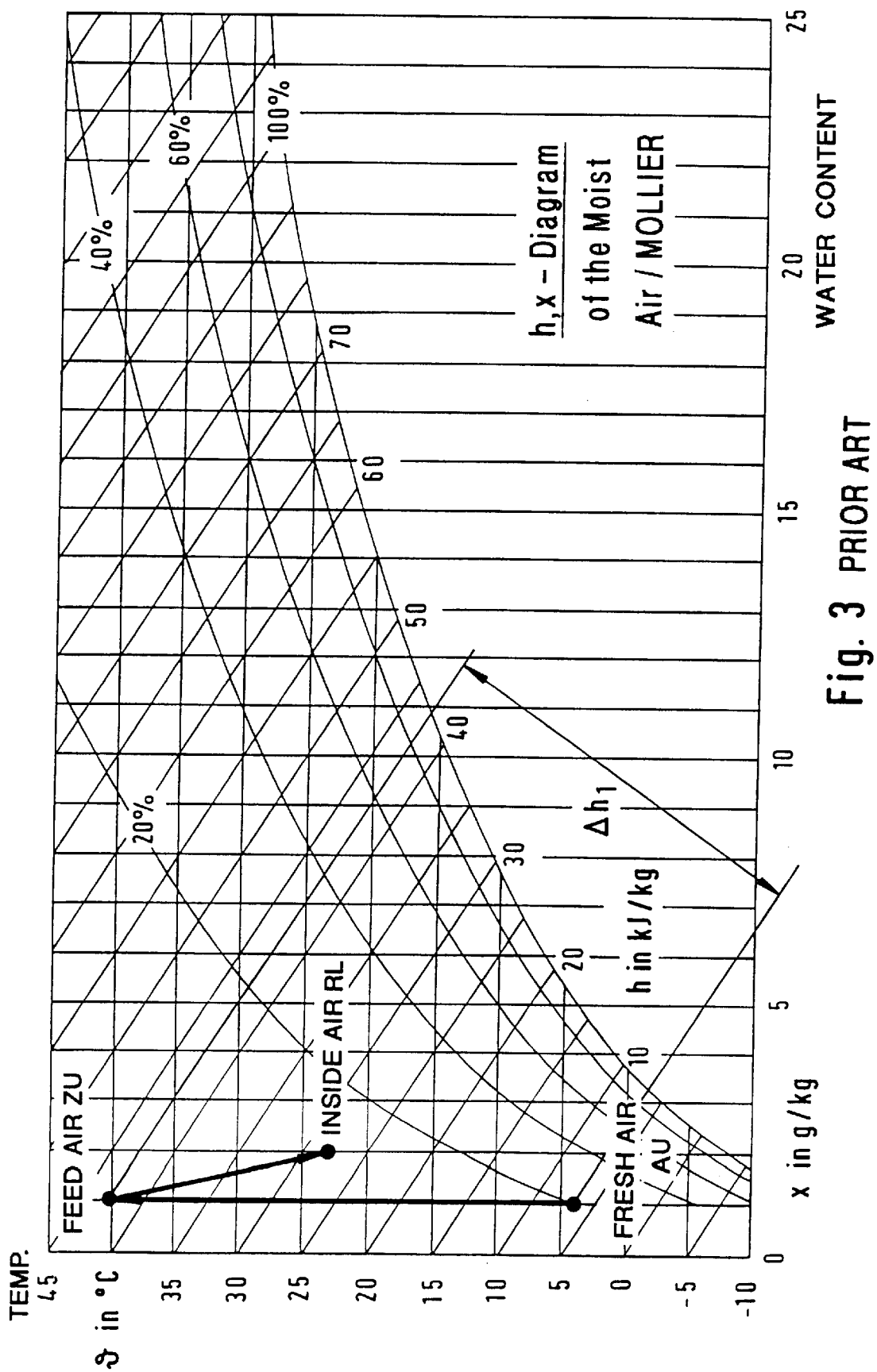
FIG. 3 is a Mollier-h,x diagram for heating/air-conditioning systems of the prior art.
Figure 4:
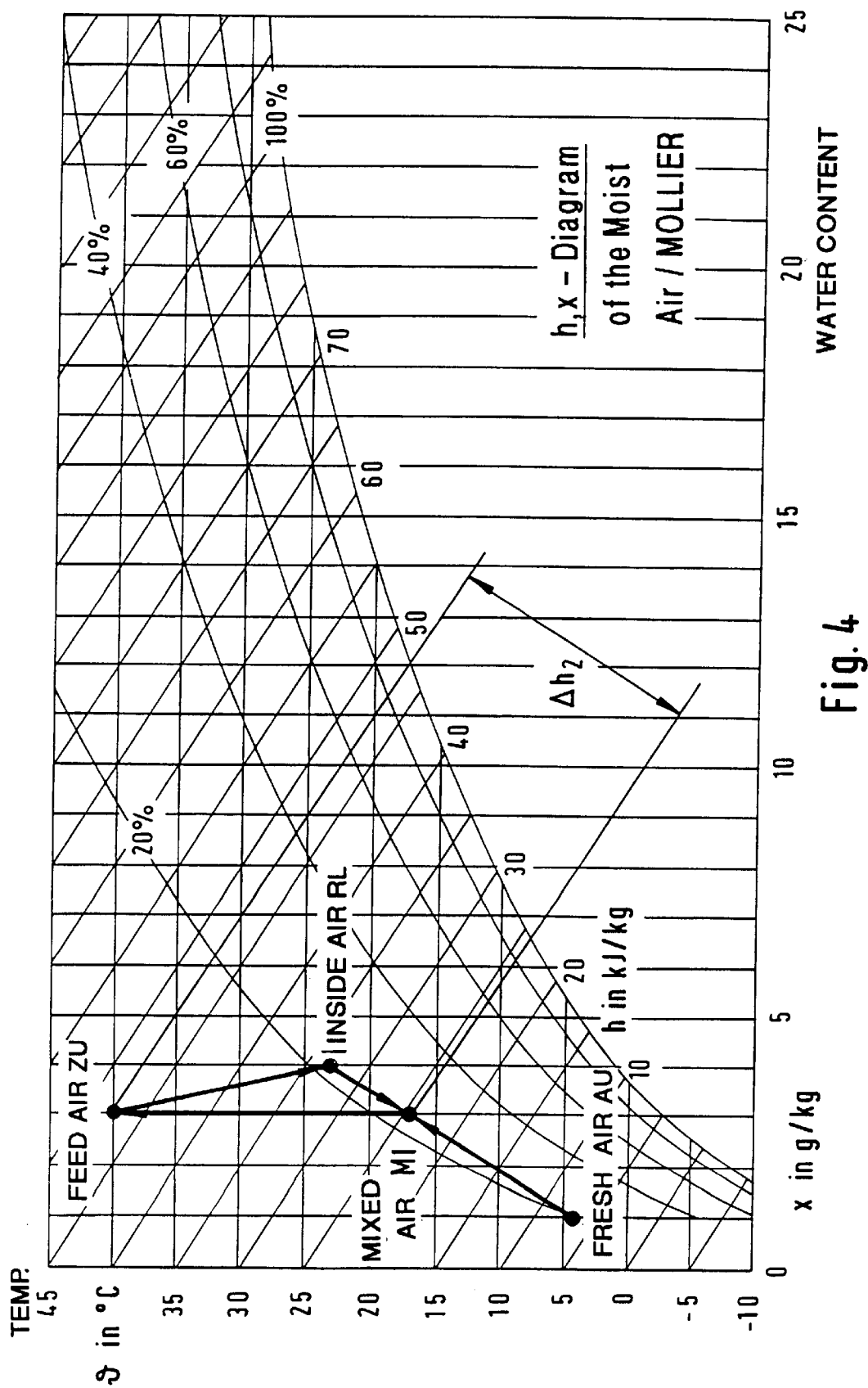
FIG. 4 is a Mollier-h,x diagram in accordance with the method of the invention.

In accordance with the method of the invention, the fresh air AU, as can be noted from FIG. 3, is mixed with the inside air RL to form a mixed air MI, which has the enthalpy $h_{MI}$. The mixed air MI thus already has a higher enthalpy than the fresh air. This mixed air MI is heated by the heating again to 40° C. and fed as feed air ZU having the enthalpy $h_{ZU}$ to the passenger compartment where the inside air RL is established with a temperature of 22° C.

In this case, heating energey $\Delta h_2 = h_Z U - h_M I$ is required. As can be noted from FIGS. 2 and 3, the energy expenditure $\Delta h_2$ of the method of the invention is always less than in accordance with the previously known method.

We claim:

1. Method for regulating mixed air of a heating/air conditioning unit of a motor vehicle, wherein fresh air and/or recirculated air is fed to the heating/air-conditioning unit, the heating/air-conditioning unit controlling the feeding of fresh air and/or recirculated air into the inside of the vehicle, the vehicle having a windshield, the method comprising steps of:

feeding air via the heating/air-conditioning unit, the air including fresh air and/or recirculated air;

adjusting the feeding of fresh air and/or recirculated air to set the temperature of a dew point of air within the vehicle lower than a temperature on an inside of the windshield of the vehicle; and establishing a minimum amount of fresh air to be adjusted as a function of an amount of moisture to be removed from the inside of the window of the vehicle.

2. A method according to claim 1, further comprising a step of measuring the relative humidity of the air and the temperature of the air within the vehicle for determining the dew point of the air within the vehicle.

3. A method according to claim 1, further comprising a step of determining the temperature of the windshield by measurement of the temperature on the inside of the windshield of the vehicle.

4. A method according to claim 1, further comprising a step of deriving the windshield temperature from the temperature of the fresh air, said deriving including a calculating of temperature from a set of correction values.

5. A method according to claim 1, wherein in said adjusting step, there is a feeding of fresh air to adjust the temperature of the dew point of the inside air by a ratio of fresh air to recirculated air, so that the dew point temperature of the inside air is less than the temperature on the inside of the windshield of the vehicle.

6. A method according to claim 1, wherein, in said feeding step, there is a selection of a moisture-based minimum fraction of fresh air flow to the total flow of air, including fresh air plus recirculated air, as a function of the number of persons present in the vehicle.

7. A method according to claim 6, further comprising steps of:

comparing the minimum stream of fresh air to meet the moisture requirement with a minimum stream of fresh air to meet an oxygen requirement; and setting the stream of fresh air to meet the larger of the two requirements.

8. A method according to claim 1, further comprising a step of introducing continuously a minimum stream of fresh air to the inside of the windshield to assure a dependable supply of oxygen for persons present in the vehicle.

9. A method according to claim 8, further comprising a step of selecting the minimum stream of fresh air based on the need for oxygen as a function of the number of the persons present in the vehicle.

10. A method according to claim 1, further comprising steps of:

determining a specific enthalpy of the fresh air and an enthalpy of the recirculated air and/or a mixed air;

comparing the enthalpies; and performing said adjustment step for adjusting the feed of fresh air and/or recirculated air to provide the mixed air with a specific enthalpy which is most favorable from an energy standpoint.

11. A method according to claim 10, wherein said heating/air-conditioning unit includes a heat exchanger, and after said comparing step there is a performing of said feeding step for the feeding of the fresh air and/or the recirculated air, and a performing of said adjusting step to provide that a smallest difference in specific enthalpy is set on the heat exchanger.

12. A method according to claim 11, wherein the enthalpy determining step takes place by measuring the temperature and the relative humidity.

13. A method according to claim 10, wherein the enthalpy determining step takes place by measuring the temperature and the relative humidity.

14. A method according to claim 10, wherein, in said enthalpy determining step, the specific enthalpy is determined by means of the wet bulb temperature.

* * * * *